United States Patent
Tanaka et al.

(12)

(10) Patent No.: US 6,482,536 B1
(45) Date of Patent: Nov. 19, 2002

(54) COATING COMPOSITION AND COATED METAL PLATE HAVING COATING FILM FORMED THEREFROM

(75) Inventors: Shoichi Tanaka; Takashi Nakano; Takao Ooshima; Masahiro Tada, all of Kanagawa-ken (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 0 days.

(21) Appl. No.: 09/673,218

(22) PCT Filed: Dec. 20, 1999

(86) PCT No.: PCT/JP99/07150

§ 371 (c)(1),
(2), (4) Date: Oct. 13, 2000

(87) PCT Pub. No.: WO01/46326

PCT Pub. Date: Jun. 28, 2001

(51) Int. Cl.[7] .................................................. B32B 15/08
(52) U.S. Cl. ........................ 428/626; 428/458; 428/460; 428/461; 428/624
(58) Field of Search ................................. 428/626, 624, 428/458, 460, 461

(56) References Cited

U.S. PATENT DOCUMENTS

| 5,236,683 A | * | 8/1993 | Nakazawa et al. | .......... 423/335 |
| 5,266,397 A | * | 11/1993 | Ogawa et al. | ............... 428/323 |
| 5,342,876 A | | 8/1994 | Abe et al. | |
| 5,623,003 A | * | 4/1997 | Tanaka et al. | ............... 523/428 |
| 5,656,250 A | * | 8/1997 | Tanaka et al. | ............... 423/335 |
| 5,883,170 A | * | 3/1999 | Tanaka et al. | ............... 524/413 |
| 5,993,975 A | | 11/1999 | Tanaka et al. | |
| 6,217,994 B1 | * | 4/2001 | Tanaka et al. | ............... 428/460 |

FOREIGN PATENT DOCUMENTS

| EP | 846739 | 6/1998 |
| JP | 5-39443 | 2/1993 |
| JP | 5-193927 | 8/1993 |
| JP | 9-111183 | 4/1997 |
| JP | 9-324141 | 12/1997 |
| JP | 10-265733 | 10/1998 |
| JP | 10-298460 | 11/1998 |
| JP | 11-302011 | 11/1999 |

* cited by examiner

*Primary Examiner*—Archene Turner

(57) ABSTRACT

The present invention relates to a coating composition containing 8 to 130 parts by weight of (B) silica fine particles having an oil absorption in the range of 30 to 200 ml/100 g and a pore volume in the range of 0.05 to 1.2 ml/g per 100 parts by weight of (A) a coating film-forming resin, a cured coating film formed from the coating composition having a glass transition temperature in the range of 40 to 125° C.; and a coated metal plate having a coating film formed from the above coating composition on the surface of a metal plate.

4 Claims, No Drawings

COATING COMPOSITION AND COATED METAL PLATE HAVING COATING FILM FORMED THEREFROM

FIELD OF THE INVENTION

The present invention relates to a non-chrome based coating composition capable of forming a coating film having good properties in corrosion resistance, fabrication properties, adhesion properties, and boiling water resistance, and a coated metal plate having a coating film formed from the coating composition.

BACKGROUND ART

A precoated metal plate such as a precoated steel sheet prepared by coil coating or the like has widely been used in the art as building materials such as roofs, walls, shutters, garages and the like for an architectural structure, and as housing-related goods such as various kinds of household appliances, panel boards, refrigerated show cases, steel furniture, kitchen furniture, and the like.

The above housing-related goods are prepared from the precoated steel sheet by a process which comprises cutting the precoated steel sheet, followed by press molding and joining, and may have a metal-exposed area as a cut surface and a crack-developed area due to press molding. Since the metal-exposed area and the crack-developed area may show poorer corrosion resistance compared with other areas, inclusion of a chrome based anticorrosive pigment into a primer coating film of the precoated steel sheet has been carried out in the art for the purpose of improving corrosion resistance.

However, the chrome based anticorrosive pigment may contain or produce a hexavalent chromium showing good corrosion resistance but imparting harmful effect to the human body, resulting in producing problems from the standpoint of an environmental protection.

Many non-chrome based anticorrosive pigments, for example, zinc phosphate, aluminum tripolyphosphate, zinc molybdate, etc., have been marketed, but may show poorer corrosion resistance compared with the chrome based anticorrosive pigment and poor boiling water resistance in a large amount, resulting in being incapable of substitute it for the chrome based anticorrosive pigment in the preparation of the precoated steel sheet.

DISCLOSURE OF THE INVENTION

The present inventors made intensive studies for the purpose of obtaining a non-chrome based coating composition capable of forming a coating film showing good properties in corrosion resistance, fabrication properties, adhesion properties and boiling water resistance to find out that the above purpose can be achieved by use of a coating composition containing specified ones of the silica fine particles used as a matting agent or the like in such an amount that a cured coating film formed therefrom may have a specified range of glass transition temperature, resulting in accomplishing the present invention.

That is, the present invention provides a coating composition containing 8 to 130 parts by weight, preferably 30 to 80 parts by weight of (B) silica fine particles having an oil absorption in the range of 30 to 200 ml/100 g and a pore volume in the range of 0.05 to 1.2 ml/g per 100 parts by weight of (A) a coating film-forming resin, a cured coating film formed from the coating composition having a glass transition temperature in the range of 40 to 125° C.

The coating film-forming resin (A) in the present invention, in a first preferable embodiment, is a mixture of 40 to 95 parts by weight of an organic resin containing hydroxyl group or epoxy group with 5 to 60 parts by weight of at least one curing agent selected from the group consisting of an amino resin, blocked polyisocyanate compound and polyvalent carboxylic acid curing agent.

The coating film-forming resin (A) of the present invention, in a preferable second embodiment, is a mixture obtained by mixing 5 to 90 parts by weight of hydroxyl group-containing polyester resin, 5 to 70 parts by weight of novolak type epoxy resin and 5 to 40 parts by weight of at least one curing agent selected from the group consisting of amino resin and blocked polyisocyanate compound based on 100 parts by weight of a total solid content.

The present invention also provides a coated metal plate having a coating film formed from the above coating composition on the surface of a metal plate optionally surface-treated.

The present invention further provides a coated metal plate prepared by forming a topcoating film having a glass transition temperature in the range of 20 to 80° C. on the surface of the coating film formed from the above coating composition on the surface of a galvanized sheet, a zinc alloy-plated steel sheet, aluminum-plated steel sheet or an aluminum plate optionally surface-treated respectively.

The coating composition of the present invention is explained more in detail hereinafter.

In the coating composition of the present invention, the film-forming resin as the component (A) may include any film-forming resins without particular limitations, and typically may include, for example, at least one resin selected from polyester resin, epoxy resin, acrylic resin, fluorocarbon resin, vinyl chloride resin and the like; mixtures of the above resin with a curing agent, and the like.

Of the above resins, in a first preferable embodiment, the film-forming resin (A) includes a mixture of a hydroxyl group or epoxy group-containing organic resin with at least one curing agent selected from amino resin, blocked polyisocyanate compound and polyvalent carboxylic acid curing agent. The hydroxyl group or epoxy group-containing organic resin particularly includes at least one resin selected from hydroxyl group-containing polyester resin and epoxy resin. The above organic resin usually has a resin acid value less than 50 mg KOH/g.

The hydroxyl group-containing polyester resin as the preferable organic resin may include an oil-free polyester resin, oil-modified alkyd resin, modified products thereof, for example, urethane-modified polyester resin, urethane-modified alkyd resin, epoxy-modified polyester resin and acrylic-modified polyester resin, and the like. The hydroxyl group-containing polyester resin may preferably have a number average molecular weight in the range of 1,500 to 35,000, preferably 2,000 to 25,000, a glass transition temperature (Tg) in the range of 10 to 100° C., preferably 20 to 80° C., and a hydroxyl value in the range of 2 to 100 mg KOH/g, preferably 5 to 80 mg KOH/g.

In the present invention, the glass transition temperature (Tg) of the resin is measured by the differential scanning calorimeter (DSC), and the number average molecular weight is measured by use of a calibration curve of a standard polystyrene in accordance with the gel permeation chromatography (GPC).

The oil-free polyester resin consists of an esterified product between a polybasic acid component and a polyhydric alcohol component. The polybasic acid component may include, as the major component, for example, at least one dibasic acid selected from phthalic anhydride, isophthalic acid, terephthalic acid, tetrahydrophthalic anhydride, hexahydrophthalic anhydride, succinic acid, fumaric acid, adipic acid, sebacic acid and maleic anhydride, and lower alkyl esterified products thereof, and in addition to the above acids, may optionally include monobasic acid such as benzoic acid, crotonic acid, p-t-butyl benzoic acid and the like, trivalent or higher polybasic acid such as trimellitic anhydride, methylcyclohexene tricarboxylic acid, pyromellitic anhydride and the like, and the like. The polyhydric alcohol may include, as the major component, for example, dihydric alcohol such as ethylene glycol, diethylene glycol, propylene glycol, 1,4-butane diol, neopentyl glycol, 3-methylpentane diol, 1,4-hexane diol, 1,6-hexane diol and the like, and, in addition to the above acid, may optionally include trihydric or higher polyhydric alcohol such as glycerine, trimethylol ethane, trimethylol propane, pentaerythritol and the like. These polyhydric alcohols may be used alone or in combination. Esterification or ester exchange reaction between both components may be carried out by a process known per se. The acid component may particularly include isophthalic acid, terephthalic acid, and lower alkyl esterified products thereof.

The alkyd resin may be prepared by reacting an oil fatty acid in addition to the acid component and alcohol component in the above oil-free polyester resin according to a process known per se. The oil fatty acid may include, for example, coconut oil fatty acid, soybean oil fatty acid, linseed oil fatty acid, sun-flower oil fatty acid, tall oil fatty acid, dehydrated castor oil fatty acid, tung oil fatty acid and the like. The alkyd resin preferably has an oil length in the range of 30% or less, particularly 5 to 20%.

The urethane-modified polyester resin may include ones prepared by reacting a polyisocyanate compound with the above oil-free polyester resin or with a low molecular weight oil-free polyester resin obtained by reacting the acid component and alcohol component used in the preparation of the above oil-free polyester resin, according to a process known per se. The urethane-modified alkyd resin may include ones prepared by reacting a polyisocyanate compound with the above alkyd resin or with a low molecular weight alkyd resin obtained by reacting respective components used in the preparation of the above alkyd resin according to a process known per se. The polyisocyanate compound used in the preparation of the urethane-modified polyester resin and urethane-modified alkyd resin may include hexamethylene diisocyanate, isophorone diisocyanate, xylylene diisocyanate, tolylene diisocyanate, 4,4'-diphenylmethane diisocyanate, 4,4'-methylenebis (cyclohexyl isocyanate), 2,4,6-triisocyanatotoluene and the like. The urethane-modified resin may preferably include ones having such a degree of modification that an amount of polyisocyanate compound forming the urethane-modified resin is in the range of 30% by weight or less based on the urethane-modified resin.

The epoxy-modified polyester resin may include reaction products by reactions such as addition, condensation and grafting between polyester resin and epoxy resin, for example, a reaction product of carboxyl group of a polyester resin prepared from respective components used in the preparation of the above polyester resin with an epoxy group-containing resin; a reaction product obtained by bonding hydroxyl group in the polyester resin to hydroxyl group in the epoxy resin through the polyisocyanate compound. A degree of modification in the epoxy-modified polyester resin is preferably such that an amount of the epoxy resin is in the range of 0.1 to 30% by weight based on the epoxy-modified polyester resin.

The acrylic-modified polyester resin may include a reaction product between a polyester resin prepared from respective components used in the preparation of the above polyester resin and an acrylic resin containing a group reactable with carboxyl group or hydroxyl group in the polyester resin prepared as above, for example, carboxyl group, hydroxyl group or epoxy group; and a reaction product prepared by grafting (meth)acrylic acid, (meth)acrylate and the like to polyester resin by use of a peroxide polymerization initiator. A degree of modification in the acrylic-modified polyester resin is preferably such that an amount of the acrylic resin is in the range of 0.1 to 50% by weight based on the acrylic-modified polyester resin.

Of the above polyester resins, the oil-free polyester resin and epoxy-modified polyester resin are preferable from the standpoints of fabrication properties and corrosion resistance.

The epoxy resin preferable as the organic resin may include bisphenol type epoxy resin, novolak type epoxy resin; and modified epoxy resins prepared by reacting various kinds of modifiers with epoxy group or hydroxyl group in the above epoxy resins. In the preparation of the modified epoxy resin, modification by use of the modifier may be carried out at any stage in the preparation of epoxy resin and at a final stage in the preparation of epoxy resin without particular limitations.

The bisphenol type epoxy resin may include, for example, a resin prepared by subjecting epichlorohydrin and bisphenol optionally in the presence of a catalyst such as an alkali catalyst to condensation reaction so as to have a high molecular weight; aid a resin obtained by subjecting epichlorohydrin and bisphenol optionally in the presence of a catalyst such as an alkali catalyst to condensation reaction to form a low molecular weight epoxy resin, followed by subjecting the low molecular weight epoxy resin and bisphenol to polyaddition reaction.

The bisphenol may preferably include bis(4-hydroxyphenyl)methane [bisphenol F], 1,1-bis(4-hydroxyphenyl) ethane, 2,2-bis(4-hydroxyphenyl)propane [bisphenol A], 2,2-bis(4-hydroxyphenyl)butane [bisphenol B], bis(4-hydroxyphenyl)-1,1-isobutane, bis(4-hydroxy-tert-butylphenyl)-2,2-propane, p-(4-hydroxyphenyl)phenol, oxybis(4-hydroxyphenyl), sulfonylbis(4-hydroxyphenyl), 4,4'-dihydroxybenzophenone, bis(2-hydroxynaphthyl) methane and the like. Of these, bisphenol A and bisphenol F are preferably used. The above bisphenols are used alone or in combination.

Examples of commercially available bisphenol type epoxy resin may include Epikotes 828, 812, 815, 820, 834, 1001, 1004, 1007, 1009, 1010 (Trade names, all marketed by Yuka Shell Epoxy Kabushiki Kaisha); Araldite AER 6099 (Trade name, marketed by Asahi-Ciba Ltd.); Epomik R-309 (Trade name, marketed by Mitsui Chemicals), and the like.

Examples of novolak type epoxy resin usable as the epoxy resin may include various kinds of novolak type epoxy resins such as phenol novolak type epoxy resin, cresol novolak type epoxy resin, phenol glyoxalic type epoxy resin and the like.

The modified epoxy resin may include an epoxy ester resin obtained by reacting, for example, a drying oil fatty acid; an epoxy acrylate resin obtained by reacting a polymerizable unsaturated monomer component; and urethane-modified epoxy resin obtained by reacting an isocyanate compound with the bisphenol type epoxy resin or the novolak type epoxy resin respectively; an amine-modified epoxy resin obtained by reacting an amine compound with the epoxy group in the bisphenol type epoxy resin, the novolak type epoxy resin or the above modified epoxy resins so as to introduce amino group or quaternary ammonium salt.

The curing agent mixed and used with the hydroxyl group or epoxy group-containing organic resin may include ones capable of reacting with the hydroxyl group or epoxy group-containing organic resin by heating to be cured, and may typically include amino resin, blocked polyisocyanate compound, polyvalent carboxylic acid curing agent and the like.

The amino resin may include a methylol melamine obtained by reaction of aldehyde with an amino component such as melamine, urea, benzoguanamine, acetoguanamine, stearoguanamine, spiroguanamine, dicyandiamide and the like. The aldehyde used in the above reaction may include formaldehyde, paraformaldehyde, acetoaldehyde, benzaldehyde and the like. The amino resin may also include ones obtained by etherifying the methylol amino resin with a suitable alcohol. Examples of the alcohol used in the etherification may include methyl alcohol, ethyl alcohol, n-propyl alcohol, isopropyl alcohol, n-butyl alcohol, isobutyl alcohol, 2-ethyl butanol, 2-ethyl hexanol and the like.

The blocked polyisocyanate compound usable as the curing agent is a compound prepared by blocking a free isocyanate group in the polyisocyanate compound with a blocking agent.

The polyisocyanate compound prior to being blocked may include organic diisocyanate per se, for example, aliphatic diisocyanates such as hexamethylene diisocyanate, trimethylhexamethylene diisocyanate and the like; cyclic fatty acid diisocyanates such as hydrogenated xylylene diisocyanate, isophorone diisocyanate and the like; and aromatic diisocyanates such as tolylene diisocyanate, 4,4'-diphenylmethane diisocyanate and the like; adducts of these organic diisocyanates with polyhydric alcohol, low molecular weight polyester resin, water and the like; cyclic polymers between above organic diisocyanates; isocyanate.biuret, and the like.

The blocking agent used in blocking isocyanato group may include, for example, phenols such as phenol, cresol, xylenol and the like; lactams such as ε-caprolactam, δ-valerolactam, γ-butylolactam, β-propiolactam and the like; alcohols such as methanol, ethanol, n- or i-propyl alcohol, n-, i- or t-butyl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, benzyl alcohol and the like; oximes such as formamidoxime, acetoaldoxime, acetoxime, methyl ethyl ketoxime, diacetylmonoxime, benzophenone oxime, cyclohexanone oxime and the like; and active methylene based ones such as dimethyl malonate, diethyl malonate, ethyl acetoacetate, methyl acetoacetate, acetyl acetone, and the like. Mixing of the polyisocyanate compound with the blocking agent makes it possible to easily block the free isocyanato group in the polyisocyanate compound.

The polyvalent carboxylic acid curing agent is a curing agent capable of contributing to curing due to reaction with epoxy group by heating in the case where the organic resin contains epoxy resin, and having at least two carboxyl groups or at least one acid anhydro-group in one molecule, and preferably is a compound having carboxyl group and having an acid value in the range of 50 to 500 mg KOH/g, preferably 80 to 300 mg KOH/g, for example, carboxyl group-containing vinyl polymer, carboxyl group-containing polyester compound and the like.

The carboxyl group-containing vinyl polymer may include copolymers of carboxyl group-containing vinyl monomer with other vinyl monomer. The carboxyl group-containing vinyl monomer may include vinyl monomers such as acrylic acid, methacrylic acid, crotonic acid, itaconic acid, maleic acid and the like; and vinyl monomers having half-esterified group, i.e. group formed by half-esterifying an acid anhydro-group in a vinyl monomer containing the acid anhydro-group, for example, maleic anhydride, itaconic anhydride etc. with an aliphatic monoalcohol or the like. The carboxyl group-containing vinyl polymer may also include a copolymer formed by half-esterifying the acid anhydro-group in a copolymer of an acid anhydro-group-containing vinyl monomer such as maleic anhydride, itaconic anhydride and the like with other vinyl monomer.

The carboxy group-containing polyester compound usable as the polyvalent carboxylic acid curing agent may typically include a low molecular weight half ester formed by the addition reaction between polyol and 1,2-acid anhydride and having a number average molecular weight in the range less than 1,000, preferably in the range of 400 to 900. The low molecular weight half ester may be obtained by reacting the polyol and 1,2-acid anhydride usually under an inert gas atmosphere in the presence of a solvent, while a ring-opening reaction of the acid anhydride being taking place, under such conditions that a polyesterification reaction due to the carboxyl group formed as above may not essentially take place, for example, at a reaction temperature of 70 to 150° C., preferably 90 to 120° C. for 10 minutes to 24 hours.

Examples of the 1,2-acid anhydride used in the preparation of the low molecular weight half ester may include succinic anhydride, methylsuccinic anhydride, dodecenylsuccinic anhydride, octadecenylsuccinic anhydride, phthalic anhydride, tetrahydrophthalic anhydride, methyltetrahydrophthalic anhydride, hexahydrophthalic anhydride, endomethylene tetrahydrophthalic anhydride, chlorendic anhydride, itaconic anhydride, citraconic anhydride, maleic anhydride and the like.

The polyol used in the preparation of the low molecular weight half ester may include diols having 2 to 20, preferably 2 to 10 carbon atoms, and at least one of tri- or more polyols. The diols may include, for example, ethylene glycol, 1,2- or 1,3-propane diol, 1,5-pentane diol, neopentyl glycol, 1,6-hexane diol, diethylene glycol, dipropylene glycol, 1,4-dimethylolcyclohexane and the like. The tri- or more polyols may include, for example, glycerin, 1,2,3-butane triol, 1,1,1-trimethylolpropane, pentaerythritol and the like.

The above curing agents may be used alone or in combination.

A mixing amount of the organic resin and the curing agent in the coating film-forming resin (A) may not particularly be limited, but usually the organic resin is in the range of 40 to 95 parts by weight, particularly 60 to 90 parts by weight, and the curing agent is in the range of 5 to 60 parts by weight, particularly 10 to 40 parts by weight as solid content per 100 parts by weight of total solid content.

The coating film-forming resin (A) of the present invention is, in a preferable second embodiment, a mixture obtained by mixing 5 to 90 parts by weight of hydroxyl group-containing polyester resin, 5 to 70 parts by weight of novolak type epoxy resin and 5 to 40 parts by weight of at least one curing agent selected from the group consisting of amino resin and blocked polyisocyanate compound based on 100 parts by weight of a total solid content.

The above hydroxyl group-containing polyester resin may include the same one as used in the first embodiment of the component (A) except for having a number average molecular weight in the range of 1,500 to 25,000, preferably 3,000 to 20,000. The novolak type epoxy resin may include ones corresponding to the epoxy resin preferable as the organic resin in the first embodiment of the component (A). The novolak type epoxy resin preferably has a number average molecular weight in the range of 2,000 or less.

The typical examples of the novolak type epoxy resin used in the present invention may include resins represented by the following general formulas (1), (2) and (3):

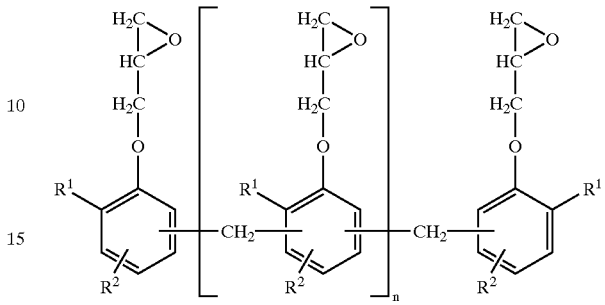
(1)

where $R^1$ represents hydrogen atom or methyl group, $R^2$ represents hydrogen atom, alkyl group having 1 to 4 carbon atoms, phenyl group, aralkyl having 7 to 10 carbon atoms, and n represents an integer of 2 to 12;

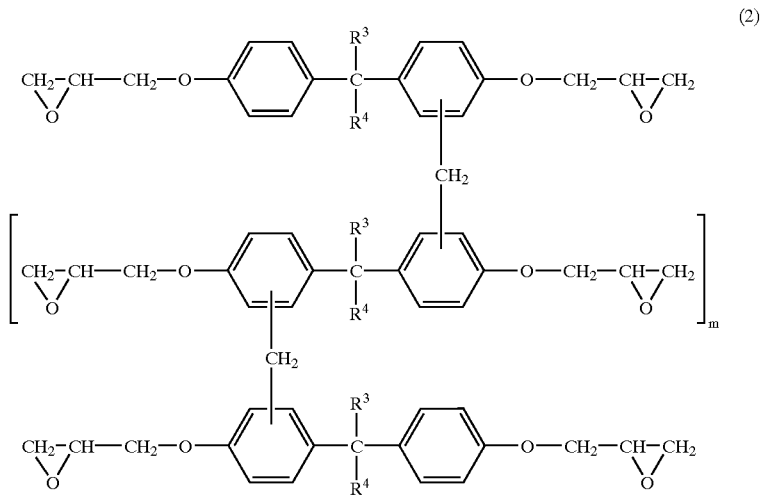
(2)

where $R^3$ and $R^4$ are same or different respectively and represent hydrogen atom or alkyl group having 1 to 3 carbon atoms, and m represents an integer of 1 to 5; and

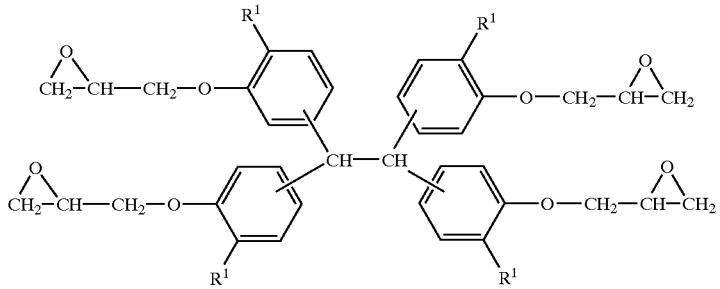
(3)

where $R^1$ is defined as above.

Examples of alkyl group having 1 to 4 carbon atoms as $R^2$ in the above general formula (1) may include groups such as methyl, ethyl, isopropyl, t-butyl and the like, and examples of aralkyl group having 7 to 10 carbon atoms therein may include groups such as benzyl, α-methylbenzyl, α,α-dimethylbenzyl, phenethyl and the like.

Examples of alkyl group having 1 to 3 carbon atoms as $R^3$ and $R^4$ in the above general formula (2) may include groups such as methyl, ethyl, n-propyl, i-propyl and the like.

Examples of commercially available novolak-based epoxy resin used in the present invention may include Epikote 152 and Epikote 154 (trade name, marketed by Yuka Shell Epoxy Co., Ltd. respectively), EPPN-201 (trade name, marketed by Nippon Kayaku Co., Ltd.), Epo Tohto YDPN-638 (trade name, marketed by Tohto Kasei Co., Ltd.) and the like as phenol novolak epoxy resin; Epikote 180S65 and Epikote 180H65 (trade name, marketed by Yuka Shell Epoxy Co., Ltd. respectively), EOCN-102S, EOCN-103S, and EOCN-104S (trade names, marketed by Nippon Kayaku Co., Ltd. respectively), Epo Tohto YDCN-701 to 704 (trade names, marketed by Tohto Kasei Co., Ltd. respectively) and the like as cresol novolak epoxy resin and others such as Epo Tohto ZX-1071T, Epo Tohto ZX-1015, Epo Tohto ZX-1247 and Epo Tohto YDG-414S (trade names, marketed by Tohto Kasei Co., Ltd. respectively), and the like.

The curing agent to be mixed and used with the hydroxyl group-containing polyester resin and the novolak type epoxy resin is reactable with the hydroxyl group-containing polyester resin and optionally with the novolak type epoxy resin by heating to cure the coating film, and is at least one curing agent selected from the group consisting of amino resin and blocked polyisocyanate compound.

The amino resin may include the same curing agent as mixed and used with the organic resin.

Of the above amino resin, melamine resin is preferable, and particularly methyl etherified melamine resin, butyl etherified melamine resin, and methyl ether-butyl ether mixed etherified melamine resin are preferable.

Specific examples of the melamine may include methyl etherified melamine resin such as Cymel 300, 303, 325, 327, 350, 730, 736 and 738 (trade names, marketed by Mitsui Cytec Co., Ltd. respectively), Melan 522 and 523 (trade names, marketed by Hitachi Chemical Co., Ltd. respectively), Nikalac MS001, MX430 and MX650 (trade names, marketed by Sanwa Chemical Co., Ltd. respectively), Sumimal M-55, M-100 and M-40S (trade names, marketed by Sumitomo Chemical Co., Ltd. respectively), Resimene 740 and 747 (trade names, marketed by Monsanto Co., Ltd. respectively) and the like; butyl etherified melamine resin such as U-VAN 20SE and 225 (trade names, marketed by Mitsui Toatsu Chemical Inc. respectively), Super Beckamine J820-60, L-117-60, L-109-65, 47-508-60, L-118-60 and G821-60 (trade names, marketed by Dainippon Ink & Chemicals, Inc. respectively) and the like; methyl ether-butyl ether mixed etherified melamine resin such as Cymel 232, 266, XV-514 and 1130 (trade names, marketed by Mitsui Cytec Ltd. respectively), Nikalac MX500, MX600, MS35 and MS95 (trade names, marketed by Sanwa Chemical Co., Ltd. respectively), Resimene 753 and 755 (trade names, marketed by Monsanto Co., Ltd. respectively), Sumimal M-66B (trade name, marketed by Sumitomo Chemical Co., Ltd.), and the like; and the like. These melamine resins may be used alone or in combination.

The blocked polyisocyanate compound may include the same ones as used as the curing agent mixed and used with the organic resin in the first embodiment.

The above curing agent may be used alone or in combination.

A mixing ratio of respective components in the second embodiment of the coating film-forming resin (A) is such that the hydroxyl group-containing polyester resin is in the range of 5 to 90 parts by weight, preferably 20 to 70 parts by weight; the novolak type epoxy resin is in the range of 5 to 70 parts by weight, preferably 10 to 50 parts by weight; and the curing agent is in the range of 5 to 40 parts by weight, preferably 10 to 30 parts by weight based on 100 parts by weight of a total solid content respectively.

An amount of the hydroxyl group-containing polyester resin in the range of 5 to 90 parts by weight is preferable from the standpoints of the fabrication properties, corrosion resistance and boiling water resistance of the coating film, and coating workability. An amount of the novolak type epoxy resin in the range of 5 to 70 parts by weight is preferable from the standpoints of corrosion resistance, particularly corrosion resistance on an edge face as a cut surface of a coated metal plate when subjected to the salt spray test, boiling water resistance, fabrication properties, curing properties of a top coating composition curable by a catalytic action of an acid catalyst and coated onto the above coating film. An amount of the curing agent in the range of 5 to 40 parts by weight is preferable from the standpoints of the curing properties and fabrication properties of the coating film.

The silica fine particles (B) in the composition of the present invention have an oil absorption in the range of 30 to 200 ml/100 g, preferably 60 to 180 ml/100 g, and a pore volume in the range of 0.05 to 1.2 ml/g, preferably 0.2 to 1.0 ml/g. The above ranges of the oil absorption and pore volume make it possible to form a coating film showing good properties in corrosion resistance and boiling water resistance.

The silica fine particles (B) has an average particle size in the range of 0.5 to 15 μm, preferably 1 to 10 μm.

In the present invention, the oil absorption is a value determined in accordance with JIS K5101 21 (1991), the pore volume is a value determined based on the nitrogen adsorption isothermal curve method defined in JIS K1150 5.2.3 (1994), and the average particle size is a value determined by measuring according to Coulter Counter method by use of Nanonizer N-4 marketed by Coulter Co., Ltd.

A mixing amount of the silica fine particle (B) in the composition of the present invention is in the range of 8 to 130 parts by weight, preferably 30 to 80 parts by weight based on 100 parts by weight of a solid content of the coating film-forming resin (A). A mixing amount less than 8 parts by weight of the silica fine particles (B) results unsatisfactory corrosion resistance of the coating film. On the other hand, a mixing amount more than 130 parts by weight results a coating film showing poor properties in boiling water resistance and fabrication properties.

The coating composition of the present invention essentially consists of the coating film-forming resin (A) and the silica fine particles (B), but usually contains an organic solvent, and optionally contains a curing catalyst, pigments; known additives for use in the coating composition, for example, anti-foaming agent, coating surface controlling agent, anti-settling agent, pigment dispersant and the like.

The organic solvent is optionally used for the purpose of improving coating properties of the composition of the present invention, and may include ones capable of dissolving or dispersing the coating film-forming resin (A). Specific examples of the organic solvent may include hydrocarbon solvent such as toluene, xylene, high boiling point petroleum based hydrocarbon and the like; ketone solvent such as methyl ethyl ketone, methyl isobutyl ketone, cyclohexanone, isophorone and the like; ester solvent such as ethyl acetate, butyl acetate, ethylene glycol monoethyl ether acetate, diethylene glycol monoethyl ether acetate and the like; alcohol solvent such as methanol, ethanol, isopropanol, butanol and the like; ether alcohol solvent such as ethylene glycol monoethyl ether, ethylene glycol monobutyl ether and the like, and the like. These solvents may be used alone or in combination.

The curing catalyst may optionally be used for the purpose of promoting a curing reaction of the coating film-forming resin (A), and may arbitrarily be selected and used depending on kinds of the curing agent to be used.

In the case where the curing agent is amino resin, particularly methyl etherified or methyl ether-butyl ether mixed etherified melamine resin, the curing catalyst preferably includes a sulfonic acid compound and an amine-neutrified product of the sulfonic acid compound. Typical examples of the sulfonic acid compound may include p-toluene sulfonic acid, dodecylbenzene sulfonic acid, dinonylnaphthalene sulfonic acid, dinonylnaphthalene disulfonic acid and the like. An amine used in the amine-neutrified product of the sulfonic acid compound may include a primary amine, secondary amine and tertiary amine. Of these, the amine-neutrified product of p-toluene sulfonic acid and/or amine-neutrified product of dodecylbenzene sulfonic acid are preferable from the standpoints of stability and reaction-promoting effect of the coating composition, resulting coating film properties and the like.

In the case where the curing agent is the blocked polyisocyanate compound, a curing catalyst promoting dissociation of a blocking agent of the blocked polyisocyanate compound as the curing agent is preferable. Examples of preferable curing catalysts may include organometal catalysts such as tin octylate, dibutyltin di(2-ethylhexanoate), dioctyltin di (2-ethylhexanoate), dioctyltin diacetate, dioctyltin dilaurate, dibutyltin oxide, dioctyltin oxide, lead 2-ethylhexanoate and the like, and the like.

In the case where the curing catalyst is a polyvalent carboxylic acid curing agent, the curing catalyst may include, for example, a quaternary salt catalyst such as tetramethylammonium chloride, tetraethylammonium bromide, tetrabutylammonium bromide, tetraethylammonium chloride, tetrabutylphosphonium bromide and the like; amines such as triethylamine, tributylamine and the like.

In the case where the curing catalyst is mixed, a mixing amount of the curing catalyst is preferably in the range of 0.1 to 2.0 parts by weight per 100 parts by weight of the coating film-forming resin (A). The amount of the curing catalyst represents an amount as sulfonic acid in the case where the curing catalyst is the sulfonic acid compound or the amine-neutrified product of sulfonic acid compound, and represents an amount as a solid content in the case where the curing catalyst is an organometal catalyst.

The pigments optionally mixed in the composition of the present invention may include color pigments such as titanium white; extender pigments such as clay, talc, calcium carbonate, barium sulfate and the like; anti-corrosive pigments such as zinc phosphate, aluminum tripolyphosphate, zinc molybdate and the like.

The composition of the present invention is such that a glass transition temperature of a cured coating film obtained from the composition of the present invention is preferably in the range of 40 to 125° C., preferably 50 to 80° C. from the standpoints of acid resistance, corrosion resistance, fabrication properties and the like. In the present invention, the glass transition temperature of the coating film is a maximum temperature determined from a tanδ change due to a temperature dispersion measurement at a frequency of 110 Hz by use of Dinamic Viscoelastometer Model Vibron DDV-II EA Type (Automatic Viscoelasticity Measuring Instrument, marketed by TOYO BALDWIN Co., Ltd.).

The composition of the present invention is capable of forming a coating film showing good properties in corrosion resistance, adhesion properties, fabrication properties and boiling water resistance, and is preferably usable as a primer coating composition for use in a metal plate.

Next, a coated metal plate by use of the composition of the present invention is explained hereinafter.

The coated metal plate of the present invention has a coating film formed by coating the coating composition of the present invention onto a metal plate as a substrate.

The metal plate as the substrate may include cold-rolled steel sheet, hot dipped galvanized sheet, electroplated galvanized sheet, steel sheet plated with zinc alloy such as zinc-iron alloy, zinc-aluminum alloy, zinc-nickel alloy and the like, aluminum plated steel sheet, stainless steel sheet, copper plated steel sheet, tin plated steel sheet, aluminum plate, copper plate and the like; and surface treated metal plate prepared by subjecting the above metal plate to the conventional metal surface treating process such as the phosphating process, chromating process and the like. Of these, zinc plated steel sheet including hot dipped galvanized sheet and electroplated galvanized sheet, zinc alloy plated steel sheet, aluminum plated steel sheet and aluminum plate, optionally subjected to the conventional metal surface treating process respectively, are preferable from the standpoints of the corrosion resistance, fabrication properties and the like of the resulting coated metal plate.

The coating composition of the present invention may be coated onto the metal plate by the conventional coating method such as roll coating method, spray coating method, brushing method, electrostatic coating method, dip coating method, electrodeposition coating method, curtain coating method, roller coating method and the like, followed by drying to form a coating film. A film thickness of the coating film formed from the composition of the present invention may not particularly be limited, but is usually in the range of 2 to 10 μm, preferably 3 to 6 μm. Drying of the coating film may be carried out under suitable conditions depending on kind of the resin to be used, but in the case where a coating film formed by the coil coating method is continuously heat cured, the heat curing may be carried out at a substrate maximum temperature of 160 to 250° C., preferably 180 to 230° C. for 15 to 60 seconds. Heat curing in the batch-wise process may be carried out at a surrounding temperature of 80 to 140° C. for 10 to 30 minutes.

The coated metal plate of the present invention may include ones having the coating film only formed from the coating composition of the present invention, but may also include ones having a topcoating film on the above coating film. The topcoating film has a glass transition temperature (Tg) in the range of 20 to 80° C., preferably 30 to 70° C., and a film thickness in the range of 8 to 50 μm, preferably 10 to 25 μm.

A topcoating composition forming the topcoating film may include conventionally available ones for use in the precoat metal plate, for example, polyester resin based, alkyd resin based, silicone-modified polyester resin based, silicone-modified acrylic resin based, fluorocarbon resin based topcoating compositions. In the case where fabrication properties are of a great importance, use of a topcoating composition having good fabrication properties such as a polyester resin based topcoating composition for use in high fabrication makes it possible to obtain a coated metal plate having particularly good fabrication properties. The topcoating composition may be coated by the conventional coating method such as roll coating method, curtain coating method, spray coating method, brushing method, electrostatic coating method, dip coating method, roller coating method and the like, followed by heat curing to suitably form a topcoating film.

The coated metal plate having the above topcoating film in the present invention shows good film performances in corrosion resistance, adhesion properties, fabrication properties, boiling water resistance and the like.

The coated metal plate of the present invention is suitably usable as, for example, building materials such as roofs, walls, shutters, garages and the like for an architectural structure; household appliances, automobiles, steel furnitures, kitchen furnitures, and the like.

Preferable Embodiment of the Invention

The present invention is explained more in detail by the following Examples, in which "part" and "%" are represented by "part by weight" and "% by weight" respectively.

Preparation Example 1

Preparation of Polyvalent Carboxylic Acid Curing Agent

A 5-liter flask equipped with stirrer, thermometer and condenser was charged with 236 parts of 3-methyl-1,5-pentane diol, 134 parts of trimethylolpropane, 1078 parts of hexahydrophthalic anhydride and 780 parts of xylene, followed by heating at 120° C. for reacting under nitrogen atmosphere, keeping a reaction mixture at that temperature for 4 hours, and cooling to obtain a solution of a half-esterified polyvalent carboxylic acid curing agent (a-1) having a solid content of 65%, Gardner viscosity (25° C.) R, and an acid value of 271 mg KOH/g.

EXAMPLE 1

A mixture of 187.5 parts (75 parts as solid content) of Vylon GK-78CS (Trade name, marketed by Toyobo Co., Ltd., polyester resin solution having a solid content of 40%, number average molecular weight of resin: about 10,000, glass transition temperature: about 40° C.), 10 parts of titanium white, 30 parts of Sylisia 740 (Trade name, marketed by Fuji Silysia Chemical Ltd., silica fine particles having oil absorption 95 ml/100 g, pore volume 0.44 ml/g, mean particle size about 3.5 μm) and a suitable amount of a mixed solvent [a 1:1 (by weight) mixed solvent of Solvesso 150 (trade name, marketed by Esso Standard Oil Co., Ltd., aromatic hydrocarbon solvent) and cyclohexanone] was prepared, followed by dispersing so that fineness of grind (coarse pigment grains particle size) may be 10 μm or less, adding 25 parts of Cymel 303 (trade name, marketed by Mitsui Cytec Co., Ltd., methyl etherified melamine resin) and 1.6 parts (0.4 part as the effective ingredient) of Nacure 5225 (trade name, marketed by King Industry Co., Ltd., U.S.A., amine salt of dodecylbenzene sulfonic acid, effective ingredient: about 25%) to the above dispersion, uniformly mixing, and adding the above mixed solvent so as to control viscosity at about 80 seconds (Ford cup #4, 25° C.), resulting in obtaining a coating composition.

EXAMPLES 2–7

Comparative Examples 1–7

Pigments were dispersed by use of the coating film-forming resin component and the mixed solvent, except for the curing agent, in the same manner as in Example 1, and Example 1 was duplicated except that compositions shown in Table 1 were used to obtain coating compositions respectively. Mixing amounts in Table 1 are represented by parts by weight (as an amount of the effective ingredient of Nacure 5225, and others as the solid content).

In Table 1, (Note 1) to (Note 12) are explained as follows.

(Note 1) Epokey 820-40CX: Trade name, marketed by Mitsui Chemicals, urethane-modified bisphenol A type epoxy resin solution having a solid content of 40%, resin number average molecular weight about 6,000, glass transition temperature about 64° C.

(Note 2) Vylon EP-2940: trade name, marketed by Toyobo Co., Ltd., epoxy-modified polyester resin solution having a solid content of 30%, resin number average molecular weight about 10,000, glass transition temperature about 72° C. (Note 3) Superbeckolite M6801-30: trade name, marketed by Dainippon Ink & Chemicals, Inc., polyester resin solution having a solid content of 30%, resin number average molecular weight about 15,000, glass transition temperature about 33° C.

(Note 4) Superbeckolite TF-787: trade name, marketed by Dainippon Ink & Chemicals, Inc., polyester resin solution having a solid content of 40%, resin number average molecular weight about 20,000, glass transition temperature about −3° C.

(Note 5) Epikote 1010: trade name, marketed by Yuka Shell Epoxy Co., Ltd., bisphenol A type epoxy resin solution having a solid content of 40%, resin number average molecular weight about 5,500, glass transition temperature about 70° C.

(Note 6) Desmodur BL-3175: trade name, marketed by Sumitomo Bayel Urethane Co., Ltd., methyl ethyl ketoxime-blocked HDI isocyanurate type polyisocyanate compound solution, solid content 75%.

(Note 7) Takenate TK-1: trade name, marketed by Takeda Chemical Industries Ltd., organotin based blocking agent dissociation catalyst, solid content about 10%.

(Note 8) TEABr: tetraethylammonium bromide.

(Note 9) Sylisia 530: trade name, marketed by Fuji Silysia Chemical Ltd., silica fine particles having an oil absorption of 170 ml/100 g, pore volume of 0.80 ml/g, average particle size of 1.9 μm.

(Note 10) Mizukasil P-766: trade name, marketed by Mizusawa Industrial Chemicals, Ltd., silica fine particles having an absorption of 90 ml/100 g, pore volume of 0.45 ml/g, average particle size of about 6.5 μm.

(Note 11) Sylisia 250N: trade name, marketed by Fuji Silysia Chemical Ltd., silica fine particles having an oil absorption of 310 ml/100 g, pore volume of 1.80 ml/g, average particle size of about 2.7 μm.

(Note 12) Sylisia 445: trade name, marketed by Fuji Silysia Chemical Ltd., silica fine particles having an oil absorption of 210 ml/100 g, pore volume of 1.25 ml/g, average particle size of about 3.5 μm.

Glass transition temperatures of the cured coating films obtained from coating compositions of Examples 1–7 and Comparative Examples 1–7 were measured according to the following method. Results are shown in Table 1.

Glass Transition Temperature of Cured Coating Film

The above coating compositions were coated onto a tinplate to be a dry film thickness of about 15 μm, followed by heat curing for 50 seconds so that a maximum temperature of the tinplate may be 225° C. to obtain cured coating films, separating the cured coating films from the tinplate by a mercury amalgam method to obtain free coating films, cutting the free coating films to size, folding the cut free coating films so as to determine glass transition temperatures as a maximum temperature determined from a tanδ change due to a temperature dispersion measurement at a frequency of 110 Hz by use of Dinamic Viscoelastometer Model Vibron DDV-II EA Type (Automatic Viscoelasticity Measuring Instrument, marketed by TOYO BALDWIN Co., Ltd.).

composition as the primer coating composition to obtain primer coating panels and topcoating panels respectively.

EXAMPLES 15–18

Example 8 was duplicated except that the coating composition of Example 2 was used as the primer coating composition, and that the following substrates were used in place of the chromate-treated 0.5 mm thick hot dipped galvanized steel sheet to obtain coating panels.

The substrates used in Examples 15 to 18 are as follows, that is, a 0.5 mm thick chromate-treated zinc-aluminum alloy (aluminum content in the plating: about 5%) plated steel sheet (may be referred to as "Zn-5% Al" in Table 2) in

TABLE 1

| | | Examples | | | | | | | Comparative Examples | | | | | | |
|---|---|---|---|---|---|---|---|---|---|---|---|---|---|---|---|
| | | 1 | 2 | 3 | 4 | 5 | 6 | 7 | 1 | 2 | 3 | 4 | 5 | 6 | 7 |
| Coating Composition | Vylon GK-78CS | 75 | 75 | | | 40 | 75 | | 75 | 75 | 75 | 75 | 75 | | |
| | Epokey 820-40cx (Note 1) | | | 80 | | | | 90 | | | | | | | |
| | Vylon EP-2940 (Note 2) | | | | | 40 | | | | | | | | | |
| | Superbeckolite M6801-30 (Note 3) | | | | 65 | | | | | | | | | | |
| | Superbeckolite TF-787 (Note 4) | | | | | | | | | | | | | | 80 |
| | Epikote 1010 (Note 5) | | | | | | | | | | | | | 75 | |
| | Cymel 303 | 25 | 25 | | 35 | 20 | 25 | | 25 | 25 | 25 | 25 | 25 | 25 | 20 |
| | Desmodur BL 3175 (Note 6) | | | 20 | | | | | | | | | | | |
| | Polyvalent carboxylic acid curing agent (a-1) | | | | | | | 10 | | | | | | | |
| | Nacure 5225 | 0.4 | 0.4 | | 0.5 | 0.4 | 0.4 | | 0.4 | 0.4 | 0.4 | 0.4 | 0.4 | 0.4 | 0.3 |
| | Takenate TK-1 (Note 7) | | | 0.2 | | | | | | | | | | | |
| | TEABr (Note 8) | | | | | | | 0.1 | | | | | | | |
| | Titanium white | 10 | 10 | 10 | 10 | 10 | 10 | 10 | 10 | 10 | 10 | 10 | 10 | 10 | 10 |
| | Sylisia 740 | 30 | 50 | 60 | | 50 | | 50 | | 5 | | | | 50 | 50 |
| | Sylisia 530 (Note 9) | | | | | | 60 | | | | | | | | |
| | Mizukasil P-766 (Note 10) | | | | 80 | | | | | | | | | | |
| | Sylisia 250N (Note 11) | | | | | | | | 50 | | | | | | |
| | Sylisia 445 (Note 12) | | | | | | | | | 50 | | | | | |
| | Zinc phosphate | | | | | | | | | | | 50 | | | |
| | Aluminum tripolyphosphate | | | | | | | | | | | | 50 | | |
| Tg (° C.) of cured coating film | | 72 | 73 | 85 | 68 | 87 | 73 | 95 | 74 | 73 | 73 | 73 | 73 | 130 | 35 |

EXAMPLE 8

The coating composition obtained in Example 1 was coated onto a chromate-treated 0.5 mm thick hot dipped galvanized sheet with a plated zinc amount of 60 g/m² to be a dry film thickness of 5 μm by use of a bar coater, followed by curing at a maximum temperature of substrate of 225° C. for 50 seconds to obtain a primer coating panel, coating Alestec AT2000 Blue (trade name, marketed by Kansai Paint Co., Ltd., polyester resin based topcoating composition, blue, glass transition temperature of cured coating film: about 31° C.) onto the primer coating film to be a film thickness of about 20 μm by use of a bar coater, and curing a maximum temperature of substrate of 230° C. for 60 seconds to obtain a topcoating panel.

EXAMPLES 9–14
Comparative Examples 8–14

Example 8 was duplicated except that coating compositions shown in Table 2 were used in place of the coating Example 15, 0.5 mm thick chromate-treated zinc-aluminum alloy (aluminum content in the plating: about 55%) plated steel sheet (may be referred to as "Zn-55% Al" in Table 2) in Example 16, 0.5 mm thick chromate treated aluminum plated steel sheet (may be referred to as "Al steel sheet") in Example 17, 0.5 mm thick chromate-treated aluminum plate (may be referred to as "Al plate") in Example 18 respectively.

Topcoating panels obtained in Examples 8 to 18 and Comparative Examples 8–14 were subjected to evaluations of coating film performances according to the following test methods. The primer coating panel was subjected to the following corrosion resistance test. Test results are shown in Table 2.

TABLE 2

|  |  | | Examples | | | | | | | | | | | Comparative Examples | | | | | | |
| --- | --- | --- | --- | --- | --- | --- | --- | --- | --- | --- | --- | --- | --- | --- | --- | --- | --- | --- | --- | --- |
|  |  | | 8 | 9 | 10 | 11 | 12 | 13 | 14 | 15 | 16 | 17 | 18 | 8 | 9 | 10 | 11 | 12 | 13 | 14 |
| Substrates | | | | | hot-dipped galvanized sheet | | | | | | Zn-5% Al | Zn-55% Al | Al steel sheet | Al plate | | | hot-dipped galvanized sheet | | | | |
| Primer coating compositions | | | | | Examples | | | | | | | | | | | | Comparative Examples | | | | |
|  |  | | 1 | 2 | 3 | 4 | 5 | 6 | 7 | 2 | 2 | 2 | 2 | 1 | 2 | 3 | 4 | 5 | 6 | 7 |
| Topcoating compositions | | | | | | | | | | | Alestec AT2000 Blue | | | | | | | | | | |
| Corrosion resistance | primer coating panel | planar area | 4 | 4 | 4 | 4 | 4 | 4 | 4 | 4 | 4 | 4 | 4 | 2 | 2 | 2 | 2 | 2 | 4 | 2 |
|  |  | 3T fabricated portion | 4 | 4 | 4 | 4 | 4 | 4 | 4 | 4 | 4 | 4 | 4 | 2 | 2 | 1 | 2 | 2 | 1 | 2 |
|  | topcoating panel | 3T fabricated portion | 4 | 4 | 4 | 4 | 4 | 4 | 4 | 4 | 4 | 4 | 4 | 3 | 3 | 2 | 3 | 3 | 2 | 3 |
|  |  | cross cut portion | 4 | 4 | 4 | 4 | 4 | 4 | 4 | 4 | 4 | 4 | 4 | 1 | 1 | 1 | 1 | 1 | 4 | 2 |
| Adhesion properties | | | 4 | 4 | 4 | 4 | 4 | 4 | 4 | 4 | 4 | 4 | 4 | 4 | 4 | 4 | 4 | 4 | 4 | 4 |
| Boiling water resistance (5 H) | | | 4 | 4 | 4 | 4 | 4 | 4 | 4 | 4 | 4 | 4 | 4 | 2 | 2 | 4 | 4 | 4 | 4 | 4 |

EXAMPLE 19

A mixture of 133.3 parts (40 parts as the solid content) of Vylon EP-2940 (trade name, marketed by Toyobo Co., Ltd., epoxy-modified polyester resin solution having a solid content of 30%, resin number average molecular weight of about 10,000, glass transition temperature of about 72° C.), 35 parts of Epikote 152 (trade name, marketed by Yuka Shell Epoxy Co., Ltd., phenol novolak type epoxy resin), 20 parts of titanium white, 30 parts of Sylisia 740 (trade name, marketed by Fuji Silysia Chemical Ltd., silica fine particles having oil absorption 95 ml/100 g, pore volume 0.44 ml/g, mean particle size about 3.5 $\mu$m) and a suitable amount of a mixed solvent [a 1:1 (by weight) mixed solvent of Solvesso 150 (trade name, marketed by Esso Standard Oil Co., Ltd., aromatic hydrocarbon solvent) and cyclohexanone] was prepared, followed by dispersing so that fineness of grind (coarse pigment grains particle size) may be 10 $\mu$m or less, adding 25 parts of Cymel 303 (trade name, marketed by Mitsui Cytec Co., Ltd., methyl etherified melamine resin) and 2.0 parts (0.5 part as the effective ingredient) of Nacure 5225 (trade name, marketed by King Industry Co., Ltd., U.S.A., amine salt of dodecylbenzene sulfonic acid, effective ingredient: about 25%) to the above dispersion, uniformly mixing, and adding the above mixed solvent so as to control viscosity at about 80 seconds (Ford cup #4, 25° C.), resulting in obtaining a coating composition.

EXAMPLE 20 to 25

Comparative Examples 15–21

Pigments were dispersed by use of the coating film-forming resin component and the mixed solvent, except for the curing agent, in the same manner as in Example 19, and Example 19 was duplicated except that compositions shown in Table 3 were used to obtain coating compositions respectively. Mixing amounts in Table 3 are represented by part by weight (as an amount of the effective ingredient of Nacure 5225, and others as the solid content).

In Table 3, (Notes) are explained as follows.

(Note 13) Vylon GK78CS: trade name, marketed by Toyobo Co., Ltd., polyester resin solution having a solid content of 40%, resin number average molecular weight of about 10,000, glass transition temperature of about 40° C.

(Note 14) Vylon 29CS: trade name, marketed by Toyobo Co., Ltd., polyester resin solution having a solid content of 30%, resin number average molecular weight of about 20,000, glass transition temperature of about 72° C.

(Note 15) Vylon 59CS: trade name, marketed by Toyobo Co., Ltd., polyester resin solution having a solid content of 50%, resin number average molecular weight of about 6,000, glass transition temperature of about 15° C.

(Note 4) Same as above.

(Note 16) Epikote 154: trade name, marketed by Yuka Shell Epoxy Co., Ltd., phenol novolak type epoxy resin.

(Note 5) Same as above.

(Note 17) Coronate 2507: trade name, marketed by Nippon Polyurethane Industry Co., Ltd., isocyanurate-blocked hexamethylene diisocyanate, solid content: about 80%.

(Note 7) Same as above.

(Note 10) Same as above.

(Note 18) Sylisia 530: trade name, marketed by Fuji Silysia Chemical Ltd., silica fine particles having an oil absorption of 170 ml/100 g, pore volume of 0.80 ml/g, mean particle size of about 1.9 $\mu$m.

(Note 11) Same as above.

(Note 12) Same as above.

Glass transition temperatures of cured coating films obtained in Examples 19 to 25 and Comparative Examples 15 to 21 were measured in the same method as above. Results are shown in Table 3.

TABLE 3

|  |  | Examples | | | | | | | Comparative Examples | | | | | | |
|---|---|---|---|---|---|---|---|---|---|---|---|---|---|---|---|
|  |  | 19 | 20 | 21 | 22 | 23 | 24 | 25 | 15 | 16 | 17 | 18 | 19 | 20 | 21 |
| Coating Composition | Vylon EP-2940 | 40 |  |  |  |  |  | 20 |  |  |  |  |  |  |  |
|  | Vylon GK-78CS (Note 13) |  | 45 | 65 |  |  |  |  | 45 | 75 |  |  | 45 | 45 | 45 |
|  | Vylon 29CS (Note 14) |  |  |  | 45 |  | 35 |  |  |  |  |  |  |  |  |
|  | Vylon 59CS (Note 15) |  |  |  |  | 25 |  | 25 |  |  |  |  |  |  |  |
|  | Superbeckolite TF-787 (Note 4) |  |  |  |  |  |  |  |  |  |  | 60 |  |  |  |
|  | Epikote 152 | 35 |  |  |  |  |  |  |  |  |  |  |  |  |  |
|  | Epikote 154 (Note 16) |  | 30 | 10 | 30 | 50 | 40 | 30 | 30 |  | 10 |  | 30 | 30 | 30 |
|  | Epikote 1010 (Note 5) |  |  |  |  |  |  |  |  |  | 65 |  |  |  |  |
|  | Cymel 303 | 25 | 25 | 25 | 25 | 25 |  | 25 | 25 | 25 | 25 | 10 | 25 | 25 | 25 |
|  | Coronate 2507 (Note 17) |  |  |  |  |  | 25 |  |  |  |  |  |  |  |  |
|  | Nacure 5225 | 0.5 | 0.5 | 0.5 | 0.5 | 0.5 |  | 0.5 | 0.5 | 0.5 | 0.5 | 0.2 | 0.5 | 0.5 | 0.5 |
|  | Takenate TK-1 (Note 7) |  |  |  |  |  | 0.2 |  |  |  |  |  |  |  |  |
|  | Titanium white | 20 | 20 | 20 | 20 | 20 | 20 | 20 | 20 | 20 | 20 | 20 | 20 | 20 | 20 |
|  | Sylisia 740 | 30 |  |  | 50 | 50 | 50 | 50 |  | 50 | 50 | 50 |  | 140 | 5 |
|  | Mizukasil P-766 (Note 10) |  | 80 |  |  |  |  |  |  |  |  |  |  |  |  |
|  | Sylisia 530 (Note 18) |  |  | 70 |  |  |  |  |  |  |  |  |  |  |  |
|  | Sylisia 250N (Note 11) |  |  |  |  |  |  |  | 50 |  |  |  |  |  |  |
|  | Sylisia 445 (Note 12) |  |  |  |  |  |  |  |  |  |  |  | 50 |  |  |
| Tg (° C.) of cured coating film |  | 86 | 69 | 71 | 89 | 57 | 85 | 66 | 67 | 71 | 127 | 33 | 71 | 71 | 71 |

EXAMPLE 26

The coating composition obtained in Example 19 was coated onto a chromate-treated 0.5 mm thick hot dipped galvanized sheet with a plated zinc amount of 60 g/m² to be a dry film thickness of 5 μm by use of a bar coater, followed by curing at a maximum temperature of substrate of 225° C. for 50 seconds to obtain a primer coating panel, coating Alestec AT2000 Blue (trade name, marketed by Kansai Paint Co., Ltd., polyester resin based topcoating composition, blue, glass transition temperature of cured coating film: about 31° C.) onto the primer coating film to be a film thickness of about 20 μm by use of a bar coater, and curing at a maximum temperature of substrate of 230° C. for 60 seconds to obtain a topcoating panel.

EXAMPLES 27–32

Comparative Examples 22–28

Example 26 was duplicated except that coating compositions shown in Table 4 were used in place of the coating composition of Example 19 as the primer coating composition to obtain primer coating panels and topcoating panels respectively.

EXAMPLES 33–36

Example 26 was duplicated except that the coating composition of Example 20 was used as the primer coating composition, and that the following substrates were used in place of the chromate-treated 0.5 mm thick hot dipped galvanized steel sheet to obtain coating panels.

The substrates used in Examples 33 to 36 are as follows, that is, a 0.5 mm thick chromate-treated zinc-aluminum alloy (aluminum content in the plating: about 5%) plated steel sheet (may be referred to as "Zn-5% Al" in Table 4) in Example 33, 0.5 mm thick chromate-treated zinc-aluminum alloy (aluminum content in the plating: about 55%) plated steel sheet (may be referred to as "Zn-55% A" in Table 4) in Example 34, 0.5 mm thick chromate-treated aluminum plated steel sheet (may be referred to as "Al steel sheet" in Table 4) in Example 35, 0.5 mm thick chromate-treated aluminum plate (may be referred to as "Al plate" in Table 4) in Example 36 respectively.

Coating panels obtained in Examples 26 to 36 and Comparative Examples 22–28 were subjected to evaluations of coating film performances according to the following test methods. Results are shown in Table 4.

Test Method

Corrosion resistance: Tests of corrosion resistance of a planar area of the primer coating panel and corrosion resistance of the topcoating panel were carried out according to the following method. Respective coating panels were cut down to a size of 70×150 mm, followed by sealing a back surface and cut face with an anti-corrosive coating composition. The primer coating panel was subjected to a 3T folding fabrication (a fabrication folding the coating panel with the surface thereof outside, followed by putting inside 3 sheets of a plate having the same thickness as the coating panel, and folding the resulting coating panel at an angle of 180° by use of a vise) at a distance of about 1 cm from the end of the sealed coating panel, followed by subjecting the resulting coating panel to a salt spray test. In the case of the topcoating panel, a cross cut reaching the substrate was formed nearly at a central portion of the sealed coating panel, followed by subjecting to the 3T folding fabrication at a distance of about 1 cm from the end of the coating panel, and subjecting to a salt spray test. The salt spray test was carried out in accordance with JIS Z-2371 for 500 hours so that, in the case of the primer coating panel, degree of rust development on the planar area and fabricated portion were visually evaluated, and in the case of the topcoating panel, degree of rust development on the fabricated portion and average width of blisters developed in the cross cut portion were visually evaluated as follows respectively.

Rust-developing Degree in the Planar Area of Primer Coating Panel

4: No rust developed in the planar area.

3: Some rust developed, but a rust-developing degree is 5% or less of the planar area.

2: A rust-developing degree is in the range of 5% or more, but less than 30% of the planar area.

1: A rust-developing degree is 30% or more of the planar area.

Rust-developing Degree in the Fabricated Portion of Primer Coating Panel and Topcoating Panel 4: No rust developed in the fabricated portion.

3: A rust-developing degree is less than 10% of the length of fabricated portion.
2: A rust-developing degree is 10% or more, but less than 30% of the length of the fabricated portion.
1: A rust-developing degree is 30% or more of the length of the fabricated portion.

Average Width of Blister in the Cross Cut Portion of Topcoating Panel
4: No blisters developed in the cross cut portion.
3: An average width of blister in one side from the cut is less than 1 mm.
2: An average width of blister in one side from the cut is 1 mm or more, but less than 5 mm.
1: An average width of blister in one side from the cut is 5 mm or more.

Fabrication Properties: A coating panel was cut to a size of 70×150 mm, followed by folding the coating panel at an angle of 180° with the coating panel surface facing outside at a room temperature of 20° C. by use of a vise to represent a minimum T number, in which no crackings develop on a folded portion any more. The T number means a number of a plate having the same thickness as the coating panel and putting inside the folded portion, and is such that the less is the T number, the better the fabrication properties. The above T number is defined such that 0T means a case where the coating panel is folded at an angle of 180° putting nothing inside the folded portion, 1T means a case where the coating panel is folded with one sheet of plate having the same thickness as the coating panel and put inside the folded portion, 2T similarly means the case where 2 sheets of plates are put, 3T similarly means the case where 3 sheets of plates are put, and 4T similarly means the case where 4 sheets of plates are put.

3: Slight separation of a part of the topcoating film at the corner of a knife cut is found.
2: Whole separation of the topcoating film is found in 1 to 20 squares among 100 squares.
1: Whole separation of the topcoating film is found in 21 or more squares among 100 squares.

Boiling Water Resistance: A topcoating panel is dipped into a boiling water at about 100° C. for 20 hours, followed by taking up to evaluate appearance of the coating film surface as follows.
4: No abnormalities such as development of blisters on the coating film are found.
3: Slight development of blisters on the coating film is found.
2: Some development of blisters on the coating film is found.
1: Remarkable development of blisters on the coating film is found.

Acid Resistance: A topcoating panel is cut to a size of 70×150 mm, followed by sealing a back face and cut face with an adhesive cellophane tape, and dipping into a sulfuric acid solution having a concentration of 3% to examine a blister area percentage on the coating film. Dipping is carried out at a liquid temperature of 20° C. for 200 hours.
4: No blisters are developed on the coating film.
3: The blister area percentage on the coating film is less than 10%.
2: The blister area percentage on the coating film is 10% or more, but less than 50%.
1: The blister area percentage on the coating film is 50% or more.

TABLE 4

| | | | Examples | | | | | | | | | | | Comparative Examples | | | | | | |
|---|---|---|---|---|---|---|---|---|---|---|---|---|---|---|---|---|---|---|---|---|
| | | | 26 | 27 | 28 | 29 | 30 | 31 | 32 | 33 | 34 | 35 | 36 | 22 | 23 | 24 | 25 | 26 | 27 | 28 |
| Substrates | | | hot-dipped galvanized sheet | | | | | | | | Zn-5% Al | Zn-55% Al | Al steel sheet | Al plate | hot-dipped galvanized sheet | | | | | | |
| Primer coating compositions | | | Examples | | | | | | | | | | | Comparative Examples | | | | | | |
| | | | 19 | 20 | 21 | 22 | 23 | 24 | 25 | 20 | 20 | 20 | 20 | 15 | 16 | 17 | 18 | 19 | 20 | 21 |
| Topcoating compositions | | | Alestec AT2000 Blue | | | | | | | | | | | | | | | | | | |
| Corrosion resistance | primer coating panel | planar area | 4 | 4 | 4 | 4 | 4 | 4 | 4 | 4 | 4 | 4 | 4 | 2 | 4 | 4 | 2 | 2 | 4 | 2 |
| | | 3T fabricated portion | 4 | 4 | 4 | 4 | 4 | 4 | 4 | 4 | 4 | 4 | 4 | 2 | 4 | 1 | 2 | 2 | 4 | 1 |
| | topcoating panel | 3T fabricated portion | 4 | 4 | 4 | 4 | 4 | 4 | 4 | 4 | 4 | 4 | 4 | 1 | 4 | 1 | 4 | 1 | 4 | 1 |
| | | cross cut portion | 4 | 4 | 4 | 4 | 4 | 4 | 4 | 4 | 4 | 4 | 4 | 1 | 4 | 3 | 3 | 1 | 4 | 1 |
| Fabrication properties | | | 0T | 0T | 0T | 0T | 0T | 0T | 0T | 0T | 0T | 0T | 0T | 0T | 0T | 4T | 0T | 0T | 3T | 0T |
| Adhesion properties | | | 4 | 4 | 4 | 4 | 4 | 4 | 4 | 4 | 4 | 4 | 4 | 4 | 4 | 4 | 4 | 4 | 4 | 4 |
| Boiling water resistance (20 H) | | | 4 | 4 | 4 | 4 | 4 | 4 | 4 | 4 | 4 | 4 | 4 | 2 | 1 | 4 | 2 | 2 | 2 | 4 |
| Acid resistance | | | 4 | 4 | 4 | 4 | 4 | 4 | 4 | 4 | 4 | 4 | 4 | 4 | 2 | 4 | 1 | 4 | 2 | 4 |

Adhesion Properties: In accordance with cross cut-tape method, JIS K5400 8.5.2 (1990), 11 vertical cut lines and 11 horizontal cut lines, which reach the substrate on the coating film of the topcoating panel at an interval of about 1 mm respectively, are formed so as to form 100 squares, followed by adhering an adhesive cellophane tape thereonto, and strongly separating tape to evaluate the coating film with squares as follows.
4: No separation of the topcoating film was found.

INDUSTRIAL APPLICABILITY

The coating composition of the present invention is capable of forming a coating film showing good properties in corrosion resistance, fabrication properties, adhesion properties, boiling water resistance and acid resistance, and is suitably usable as the primer coating composition. The coating composition of the present invention is free of the chromate based pigment as the anticorrosive pigment, and is capable of solving the problem due to hexavalent chromium so as to be advantageous from the standpoints of safety and health.

The coated metal plate obtained by forming a topcoating film on the primer coating film formed from the coating composition of the present invention show good properties in corrosion resistance, fabrication properties, adhesion properties, boiling water resistance and acid resistance. The coating composition of the present invention is usable as the primer coating composition particularly for use in the pre-coated metal plate.

What is claimed is:

1. A coating composition containing 30 to 80 parts by weight of (B) silica fine particles having an oil absorption in the range of 30 to 200 ml/100 g and a pore volume in the range of 0.05 to 1.2 ml/g per parts by weight of (A) coating film-forming resin which is a mixture obtained by mixing 5 to 90 parts by weight of hydroxyl group-containing polyester resin, 5 to 70 parts by weight of novolak epoxy resin and 5 to 40 parts by weight of at least one curing agent selected from the group consisting of amino resin and blocked polyisocyanate compound, a cured coating film formed from the coating composition having a glass transition temperature in the range of 40° to 125° C.

2. The coating composition as claimed in claim 1, wherein the hydroxyl group-containing polyester resin has a number average molecular weight of 2,000 to 25,000, and a glass transition temperature in the range of 10° to 100° C.

3. The coated metal plate having a coating film formed from the coating composition as claimed in claim 1 on the surface of a metal plate which may be surface treated.

4. The coated metal plate as claimed in claim 3, wherein the coated metal plate is prepared by forming a topcoating film having a glass transition temperature in the range of 20° to 80° C. on the surface of the coating film formed from the galvanized sheet, a zinc-alloy plated steel sheet, aluminum-plated steel sheet or an aluminum plate which may be surface treated respectively.

* * * * *